Jan. 20, 1925.
H. A. TRUSSELL
1,523,676
BELT TIGHTENING DEVICE
Original Filed Feb. 9, 1917    2 Sheets-Sheet 1
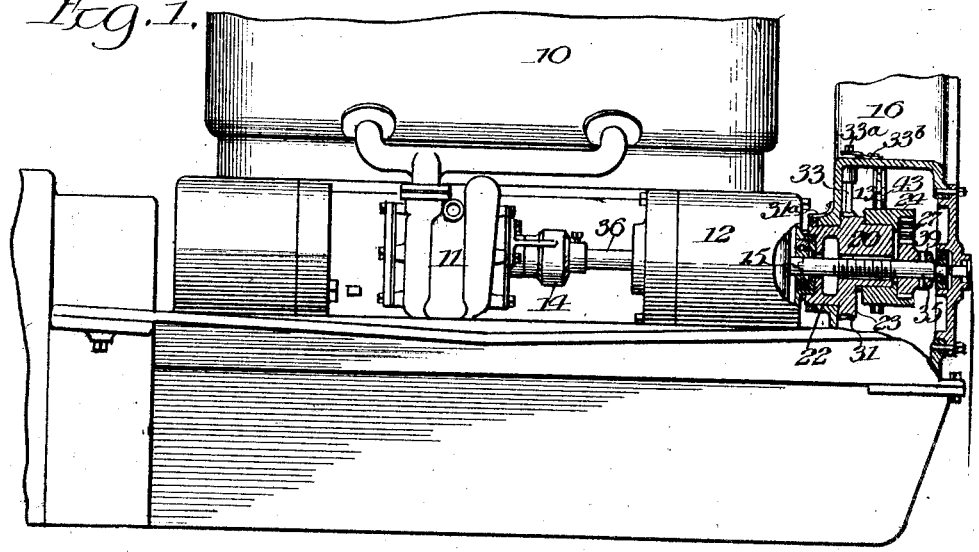
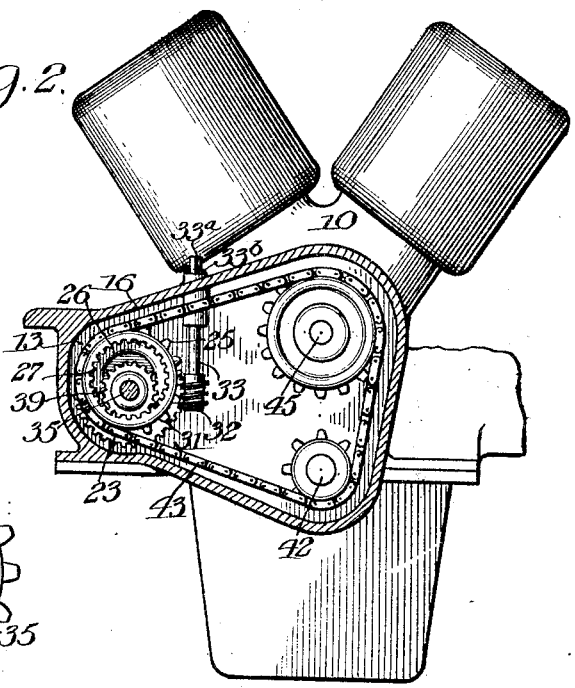
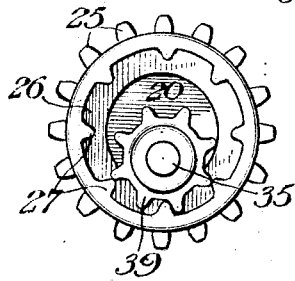
Inventor
Homer A. Trussell
by Otto M. Hermich
Atty.

Jan. 20, 1925.
H. A. TRUSSELL
1,523,676
BELT TIGHTENING DEVICE
Original Filed Feb. 9, 1917    2 Sheets-Sheet 2
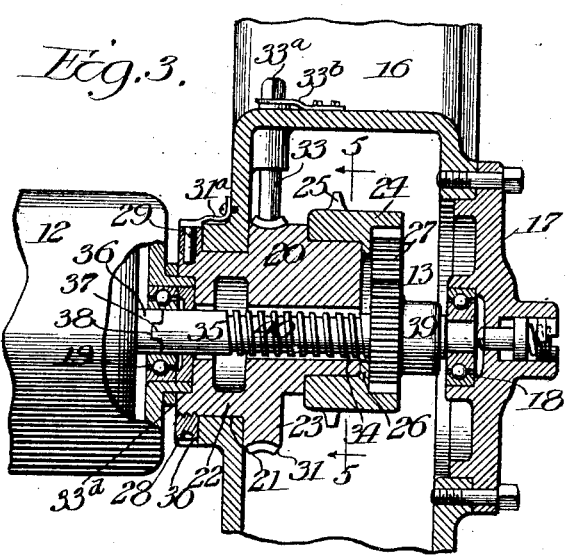
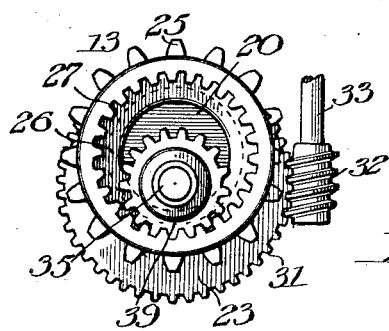
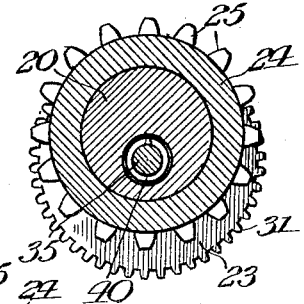
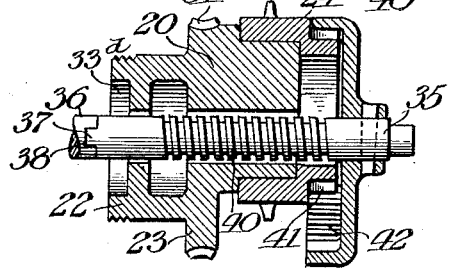
Inventor
Homer A. Trussell
by Otto M. Nernich
Atty.

Patented Jan. 20, 1925.

1,523,676

UNITED STATES PATENT OFFICE.

HOMER A. TRUSSELL, OF CHICAGO, ILLINOIS.

BELT-TIGHTENING DEVICE.

Substitute for application Serial No. 147,541, filed February 9, 1917. This application filed September 1, 1920. Serial No. 407,566.

*To all whom it may concern:*

Be it known that I, HOMER A. TRUSSELL, a citizen of the United States, residing at Chicago, in the county of Cook and State of Illinois, have invented a certain new and useful Improvement in Belt-Tightening Devices, of which the following is a full, clear, concise, and exact description, reference being had to the accompanying drawings, forming a part of this specification.

This application is a substitute for an application filed by me February 9, 1917 Serial No. 147,541 and relates to tightening mechanism for belt, chain or friction driven devices, and has for its object the production of a device of this character in which this may be accomplished without shifting the shafts by which the several mechanisms are driven.

A further object is to arrange the parts so that this adjustment can readily be made without necessitating the removal of any of the parts of the casing within which the belt or friction members are arranged, also to construct and arrange the parts so that any adjustment thereof will not create or demand a corresponding or increased movement of the other parts of which the device is composed.

In addition to the above the arrangement permits various speed ratios to be gained to suit the many requirements of devices of this nature.

Another object of the invention is to arrange the parts so that they may be readily removed from the casing and to permit the separation of the aforesaid device with the least possible effort and inconvenience, so that the time consumed in making repairs or changing the speed ratios above mentioned will be reduced to a minimum.

The invention will be more readily understood when read in conjunction with the drawings, in which—

Fig. 1 is a side elevation of an automobile motor showing the structure of the invention in section and applied thereto;

Fig. 2 is an end view of Fig. 1 partially in section;

Fig. 3 is an enlarged central section showing more in detail the construction illustrated in section in Fig. 1;

Fig. 4 is an end view of a portion of the invention;

Fig. 5 is a section taken on line 5—5 of Fig. 3;

Fig. 6 is a view of a modification of the device shown in Figs. 1 and 3; and

Fig. 7 is a view showing a means whereby the speed of a driving and driven member may be rotated at the same speed.

The device illustrated in Fig. 1 comprises the motor 10, the pump 11, the generator 12 and the mechanism comprising the invention generally designated 13. The pump 11, generator 12 and the mechanism 13 have the ends of their respective shafts detachably connected together by the coupling 14 and the generator and the mechanism 13 by the tongue and groove construction 15. By arranging the parts as above described, the generator may readily be removed from between said pump and mechanism 13 by simply unscrewing the coupling 14 from the pump shaft, sliding same along the generator shaft a short distance which permits sufficient endwise movement to be imparted to the generator to separate it from the mechanism 13 so that it may be lifted away without necessitating the removal of the pump 11, which is of great advantage as the time consumed in accomplishing this end is thereby reduced to a minimum.

The device generally designated 13 is mounted within the casing 16, having the removable cap plate 17 and is journaled therein in bearings 18 and 19. The device 13 generally consists of the eccentric 20 having the concentric hub 22, which is loosely journaled in the casing 16 at 21. Intermediate the hub 22 and the eccentric portion 20 is arranged the annular collar 23 having the gear teeth 31. Upon this eccentric portion 20 is mounted or arranged the rotatable member 24 which is provided with the sprocket teeth 25, the inwardly projecting flange 26 and the internally geared portion 27. A clamping ring 28 is arranged outside of the casing 16 and upon the concentric hub portion 22 and is preferably positioned thereon so that the portion 21 of the casing 16 will be interposed between it and the annular flange or collar 23. These portions co-operate and act to hold the eccentric 20 against endwise movement. A set screw or pin 29 may be provided to hold the clamping ring with relation to the eccentric after the desired adjustment has been made. The end of the eccentric upon which the clamping ring 28 is provided is recessed at 33ᵈ to receive the end of the casing 12 and the bearing 19. This ring may have a series of serrations or notches 30, provided in its periphery, which with the co-operation of the member 31ª assists in preventing the eccentric from moving from its adjusted position. A convenient means whereby the eccentric may be readily adjusted from the outside of the casing without great inconvenience is also provided. This means consists of a worm wheel 32 which engages the teeth 31 of the collar 23 carried by the rod 33 which is mounted to rotate in a boss provided in the casing 16. This rod extends beyond said casing and is preferably provided with the squared head 33ª which may be engaged by a wrench to turn said shaft and worm wheel when an adjustment of the eccentric is necessitated. To prevent any accidental turning of this rod the lock 33ᵇ is provided, which in this instance is illustrated as composed of a flat piece of metal having an aperture which engages the squared head of the rod 33ª.

The eccentric 20 is bored as shown at 34 to receive the shaft 35. This bore is in alignment with respect to the shaft 36 of the generator. The shafts 35 and 36 are provided with the tongue and groove 37 and 38 respectively, which forms the connection 15 above referred to. The shaft 35 has its opposite ends journalled in the bearings 18 and 19 and has the pinion 39 provided at its end adjacent the internal gear 27 and meshes therewith. This pinion is keyed or otherwise secured to the shaft and causes rotation thereof when the member 24 is actuated. This shaft may be provided with threads 40 which form a means whereby the oil flowing from the other portions of the device may be fed back into the casing 16.

The modification shown in Fig. 6 is similar in construction to that disclosed in Fig. 3, only differing in that the eccentric is provided with an external gear 41 which co-operates with an internal gear 42 secured to the shaft 35. By the arrangement shown in Fig. 7 the speed of the member 24 and the shaft 35 will correspond while in the structures shown in Figs. 4 and 6 the speed ratio will differ and may be varied to suit various conditions which the device may be subject to.

From the foregoing it can readily be seen that the parts are arranged and constructed so that the same can conveniently be replaced without any great annoyance and all that will be necessary when some portion thereof needs attention is to remove the cap plate 17. This permits the gear 39 and shaft 35 to be withdrawn through the opening covered by the plate 17, also the member 24 and then the eccentric 20. Should the generator 12 need repairs or replacement all that is necessary is to unscrew the coupling 14 and shift the same along the shaft of the generator and by a slight endwise movement away from the casing 16 detach it without also removing the pump, as is necessary in present constructions.

Generally speaking the operation necessary to take up any slack of the chain 43 which is shown as cooperating with gears arranged upon shafts such as 44 and 45 will be substantially as follows: The lock 33ᵇ will be removed from engagement with the squared end of the rod, the clamping ring 28 will be released so that the eccentric is free to turn. Then by the application of a suitable wrench to the squared head of the rod 33 the worm wheel 32 may be rotated, which by virtue of its connection with the toothed portion of the collar 23 will shift the eccentric and take up any slack in the chain 43. It will be evident that regardless of the relation of the eccentric and the pinion 39, that same will at all times properly mesh with the toothed portion 27 and rotate the shaft 35. The construction herein described is susceptible of various changes and modifications which may be made without departing from the spirit of the invention, and having explained one embodiment thereof what I claim and desire to cover by Letters Patent is:

1. In a device of the class specified, the combination of a rotatable member mounted at one end in a support, said member having an eccentric portion, a rotatable member arranged upon the eccentric portion and being adjustable by the eccentric portion when said member is rotated, a shaft passing through said member and having means for actuated by rotatable member which is arranged upon the eccentric portion, and said member, rotatable member, shaft and means provided thereon being removable from the support as a unit.

2. In a device of the class specified, the combination of a rotatable member mounted at one end in a support, said member having means for rotating the same and an eccentric portion, a rotatable member arranged upon the eccentric portion and being adjustable by the eccentric portion when said member is rotated, a shaft passing through said member and having means for actuated by rotatable member arranged upon the eccentric portion, said member, rotatable member, shaft and means provided thereon being removable from the support as a unit.

3. In a device of the class specified, the combination of a rotatable adjustable member mounted at one of its ends in a support, said member having a portion concentric with said end, means for rotating said member, said means being provided upon the concentric portion of said member, the rotatable member having an eccentric portion, another rotatable member mounted upon the eccentric portion of the first mentioned rotatable member, and being adjustable by the eccentric portion upon the rotation of said member, and means for rotating the rotatable member which is arranged upon the eccentric, said first mentioned rotatable member, said means and rotatable member which is arranged upon the eccentric being removable from the support as a unit.

4. In a device of the class described, the combination of a casing, a rotatably adjustable member journalled in the casing, said member having an eccentric portion, a rotatable member arranged upon the eccentric portion, said rotatably adjustable member and the member provided thereon being permitted to be mounted with respect to and removed from the casing as a unit.

5. In a device of the class described, the combination of a casing, a rotatably adjustable member journalled in the casing, said member having an eccentric portion, a rotatable member arranged upon the eccentric portion, means driven by the rotatable member mounted upon the eccentric portion, said rotatably adjustable member, the member provided thereon and the driven member being permitted to be mounted with respect to and removed from the casing as a unit, and a removable collar preventing the separation of said rotatably adjustable member from said casing.

6. In a device of the class specified, the combination of a rotatably adjustable member mounted at one of its ends in a support, means concentric with said end for rotating said member, an eccentric portion provided upon the rotatably adjustable member and being adjustable by the concentric portion, a rotatable member arranged upon the eccentric portion, and means driven by said last mentioned rotatable member, said last mentioned rotatable member and means being removable from the eccentric as a unit.

7. In a device of the class described, the combination of a casing, a rotatably adjustable member journalled in the casing, said member having a concentric and eccentric portion, a member rotatably arranged upon the eccentric portion, means for driving the rotatable member arranged upon the eccentric portion, means driven by said rotatable member and means for adjusting the adjustable member, said last mentioned means including a portion provided upon the concentric portion, said last mentioned means and the rotatable member, driven member and adjustable member being removable from the casing as a unit.

8. In a device of the class described, the combination of a support, a rotatably adjustable member carried by the support, means for rotating the adjustable member, said member being provided with an eccentric portion, a rotatable element provided upon the eccentric portion, a rotatable member cooperating with the member provided upon the eccentric and means whereby the adjustable member, the member arranged upon the eccentric and the member which cooperates therewith may be removed from the support as a unit.

9. In a device of the class described, the combination of a support, a rotatably adjustable member journalled with respect to the support, said member having an eccentric portion, and a member arranged upon the eccentric portion, said rotatably adjustable member being permitted to be mounted with respect to and removable from the support as a unit.

10. In a device of the class described the combination of a rotatable adjustable member having an eccentric portion, a rotatable member provided upon the eccentric portion, a shaft, means provided upon the shaft cooperating with the member provided upon the eccentric, said shaft and the means provided thereon being removable from the rotatably adjustable member as a unit.

11. The combination of an adjustable member, a rotatable member supported by said adjustable member, another rotatable member mounted eccentrically to said first mentioned rotatable member, said adjustable member being adapted to swing the center of said first mentioned rotatable member about the center of said second mentioned rotatable member and means for transmitting rotary motion from one to the other of said rotatable members, said second mentioned rotatable member being supported by two bearings arranged at opposite sides of and beyond said adjustable member.

In witness whereof, I hereunto subscribe my name this 29th day of July, A. D., 1920.

HOMER A. TRUSSELL.